United States Patent [19]
Jordan

[11] 3,848,757
[45] Nov. 19, 1974

[54] SORTING AND STACKING OF FOOD SLICES
[75] Inventor: Ingo Jordan, Hamburg, Germany
[73] Assignee: Lever Brothers Company, New York, N.Y.
[22] Filed: Sept. 18, 1973
[21] Appl. No.: 398,516

Related U.S. Application Data
[63] Continuation of Ser. No. 242,651, April 10, 1972, abandoned.

[30] Foreign Application Priority Data
Apr. 13, 1971 Germany.............................. 2117839

[52] U.S. Cl................ 214/152, 214/6 M, 214/6 N, 214/6 DS
[51] Int. Cl............................................ B66c 17/06
[58] Field of Search.......... 214/6 DS, 6 M, 6 S, 152; 209/121, 74

[56] References Cited
UNITED STATES PATENTS
3,476,241 11/1969 Ungerer................................ 209/74
3,627,127 12/1971 Whiteforn............................ 209/121

Primary Examiner—M. Henson Wood, Jr.
Assistant Examiner—Gene A. Church
Attorney, Agent, or Firm—Lever Brothers Company

[57] ABSTRACT

Slices of flexible material such as cheese are formed into stacks by use of a special form of conveyor. The conveyor uses vacuum and a release mechanism to form particularly accurate stacks, and can also sort the slices by weight and form interleaved or overlapping stacks or combine material emanating from different sources.

4 Claims, 2 Drawing Figures

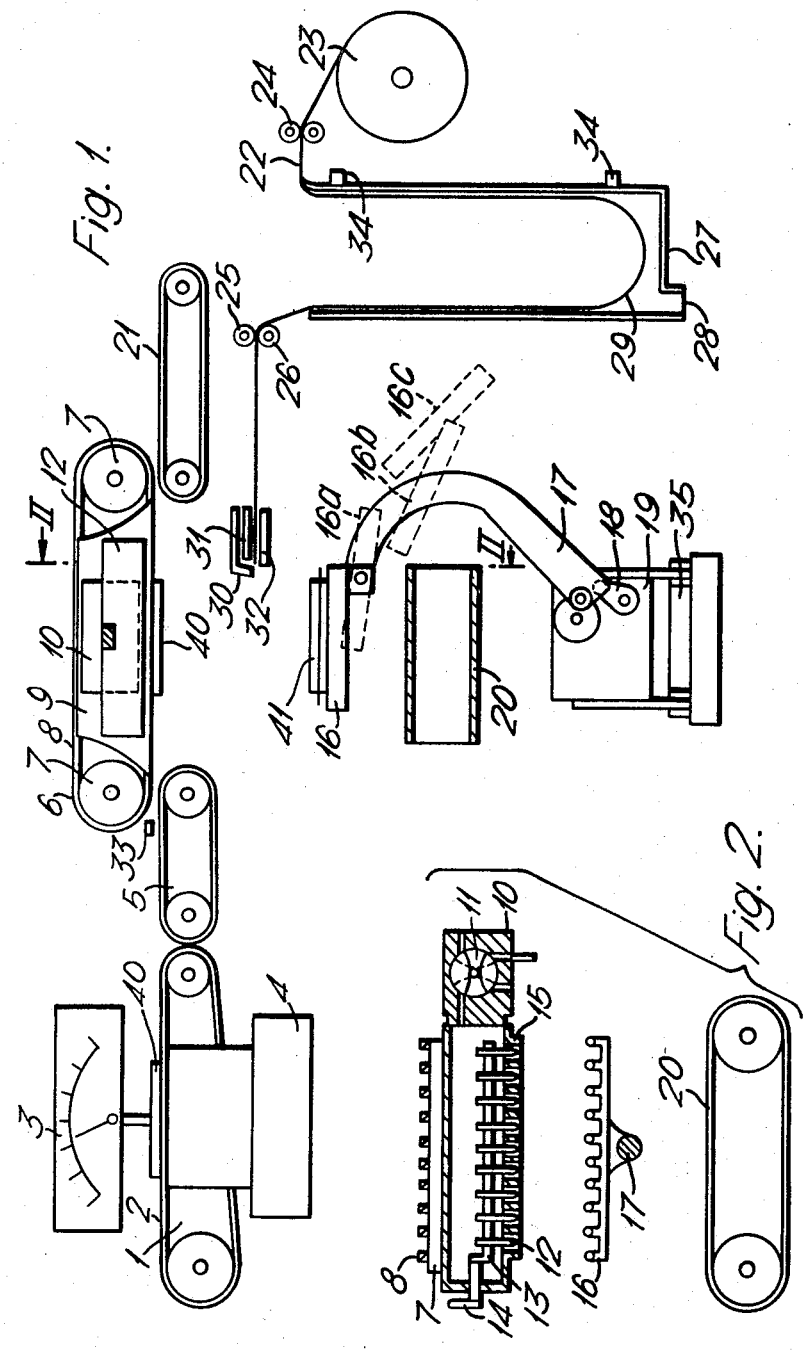

SORTING AND STACKING OF FOOD SLICES

This is a continuation of application Ser. No. 242,651, filed Apr. 10, 1972, now abandoned.

The invention relates to a method of forming stacks of food slices with an accurate form. Preferably the slices and pieces deviating in weight are separated from the others.

Hitherto stacks of food slices have been formed at a cutting machine. The individual slices fell one after the other on to a stacking surface in a random fashion. The stacks formed in this way were of irregular form. To overcome this the invention provides a method of forming stacks of flexible food slices comprising feeding a series of flexible food slices in turn to the underside of a moving air permeable conveyor, attaching each slice in turn to the underside of the conveyor by vacuum, conveying each attached slice to a position over a stacking support, stopping said conveyor with said slice at said position, releasing the vacuum and forcibly releasing said slice to allow it to fall from the conveyor and form a stack on said stacking support. This method allows accurately defined stacks to be produced.

A further problem was that the stacks were not uniform in weight. Resetting the cutting machine to correct the thickness of the slices or the number of slices could not be done without a considerable loss of time. With foods such as cheese, sausage, ham, rock salmon etc. deviations occur fairly suddenly, however, in the dimensions of the pieces to be cut and in the consistency of the product. Portions from the ends of the pieces therefore frequently had to be repacked by hand. Sorting out the end pieces or pieces which broke off during cutting could not be done either without some work by hand. According to a further feature of the invention each slice is weighed before being attached to the conveyor and only slices of correct weight are released over said stacking support. Preferably slices of incorrect weight are conveyed beyond the position over said stacking support to a reject station and there released. Such weighing operations can be carried out with known electronic control devices with practically no restriction on the speed of the process, and can be used as a feedback control on the size of slices initially produced.

The principal features of the invention relate to conveying the slices, forming the stacks and if necessary sorting out pieces of incorrect weight preferably at a high speed. A further feature of the invention enables sheets of paper to be interleaved between the individual slices, the slices to be stacked in an overlapping arrangement and an aggregate pack of part stacks of various types sliced on various machines to be formed. For the latter purpose the stacking support is shifted in alternating directions from under said conveyor during formation of the stack so that the stack is formed with a staggered configuration. Alternatively one stacking support is shifted between two air permeable conveyors to receive slices at different times from each of the conveyors and form a stack of slices emanating from two sources.

In order to carry out the preferred process according to the invention a weighing conveyor preferably arranged in advance of a slicing machine is used. The slices fed in by the weighing conveyor or another suitable means of conveyance are, according to the invention, caught by the bottom of the air permeable conveying device and placed under vacuum. This device takes the slices and pieces which are of incorrect weight to a reject station at its end and there discharges them into a chute or on to another conveyor belt. Slices which are about the right weight are only conveyed to a certain point on the air-permeable conveying device. There, through braking the conveying device until it comes to a standstill, removing the vacuum and preferably applying mechanical pressure at the same time evenly over the surface of the slices, they are dropped on to a stacking surface by the conveying device. When a specific number of slices forms a stack or part of a stack on the stacking surface the latter drops them vertically on to a conveyor. This conveyor may already contain another part of a stack sliced earlier on another slicing machine. Conveyance by the air-permeable conveying device enables the slices fed in by the feed belt to be gripped securely and released at a certain point on to the partly formed stack in such a way that the individual slices lie substantially squarely on top of one another. The slices neither slide against each other nor do individual slices buckle, which would be the case if they were thrown roughly horizontally on to a bearing surface and against a stop plate. The mechanical release of the slices from the conveying device means that foods with a moist, fatty or sticky surface can be satisfactorily released at the right point from the air-permeable conveying device. The vacuum in the chamber can, for instance, be controlled by a rotating valve which not only closes off the suction pipe but also simultaneously ventilates the chamber, so that the vacuum quicly collapses. The gap between the air-permeable conveying device and the conveyor belt from which the food slices are taken can be adjusted to the slice thickness setting of the slicing machine by hand or, for instance, via a mechanical coupling in such a way that widely varying slice thicknesses can be handled. In this way a high operating speed of, say, up to 300 slices per minute can be achieved.

In a further embodiment of the process according to the invention sheets of paper can be placed between the individual slices. In order to do this a sheet of paper is pushed forward horizontally into the path of the slices being released downwards from the air-permeable conveying device and cut off from its delivery web when the falling slice touches the paper. The sheet of paper is pushed forward a little above the maximum height of the stack on the stacking surface. Owing to the fact that the slice is already in contact with the sheet of paper when it is being cut off, the sheet of paper does not slip to the side as it drops down.

In order to produce overlapping stacks in which the top slice is always staggered to one side or the other in relation to the one below it the stacking surface with the slices already on it is displaced according to the invention by an interval producing the overlapping every time a slice falls. When the stack has been released on to the conveyor which carries it further the stacking surface returns to its original position.

The separate movements of the air-permeable conveying device, the paper infeed and the stacking surface are controlled by the conveyor scales and a scanning device arranged in the conveying direction before the air-permeable conveying device, in conjunction with an electronic computer.

A preferred apparatus for carrying out the process may comprise a conveying device which feeds in the slices. The conveying device can be a conveyor belt or the weighing conveyor itself. At the end of the conveyor belt there is a scanning device for the slices. Immediately after the conveyor belt is an air-permeable conveying device on the bottom of which the slices are held by vacuum. A further conveyor belt, preferably moved in stages, is used to remove the formed stacks. In this apparatus the air-permeable conveying device comprises a number of narrow belts parallel to one another and with non-slip drive. Along the bottom of these belts there is a vacuum chamber. The latter is provided with a device for breaking the vacuum. The narrow belts have a certain space between them in which release blades which move downwards are fitted. Below the air-permeable conveying device a stacking surface which can be moved downwards and sideways is provided. This surface is on a lever which is swivellable by means of a crank gear. The crank gear is designed in such a way that when it moves the speed at which the stacking surface moves vertically downward is greater than that of the falling slices. It also makes it possible to move the stacking surface downwards in a roughly vertical direction and then simultaneously downwards and sideways. Finally, it returns the stacking surface to its initial position in an arc over any slices of the stack still falling.

The sheets of paper to be placed between the slices are fed in by take-up rollers which are continuously operated and remove the paper from a magazine roll. The paper is pushed into the cutting apparatus by means of intermittently driven feed rollers. Between the feed rollers and the take-up rollers the web of paper forms a loop which is taken up by a shaft. The loop is drawn into this shaft by vacuum. It has been found that the paper can be fed in at high speed in this way. Between the feed rollers which push the web of paper into the path of the slices falling from the air-permeable conveyor and the paper cutter there is a flexibly-mounted clamp which grips the paper after it is pushed forward until the end of the cutting operation and smoothes off the cut edge of the remaining web after the upper blade has cut it. In order to prevent rolling up of the sheet of paper pushed forward into the path of the falling slices, the feed rollers are preferably provided with devices for producing corrugations in the direction in which the paper is being conveyed. For this purpose the web of paper is folded to form an angle or merely curved at both sides at a certain distance from the edge. One roller has, for instance, heavy conical beading at both ends which folds over the sides. The corrugation is carried out by pressing with a shorter counter-running roller, the paper being stamped between the bead groove and the edge of the counter-running roller.

The apparatus according to the invention and the process to be carried out with it are described below with the aid of the attached drawings which only illustrate one embodiment.

FIG. 1 is a lateral view of the apparatus.

FIG. 2 is a cross section of the line II—II.

The slices 40 fall from a cutting apparatus (not illustrated) preferably first on to a weighing conveyor comprising a conveyor belt 2, an indicating instrument 3 and a weighing device 4 and coupled with an electronic computer. After this a conveyor belt 5 can take over conveyance of the slices 40. A scanning device 33, preferably a photocell, detects the approach of the slice 40 and in conjunction with the electronic computer sets the air-permeable conveying device 6 in motion. At the same time the air is removed from the vacuum chamber 9 through the vacuum channel 10 by opening the shut-off device 11. The air-permeable conveying device 6 running via the guide rollers carries along the slices on its lower side owing to the vacuum in the chamber 9. Depending on the weight of the slice 40 determined by the conveyor scales 1, the slice is either carried along to the end of the conveying device 6 and cast out as a piece with the wrong weight on to the belt 21 or carried to about the middle of the conveying device 6 to a position above a stacking support and dropped there on to the stack 41. For this purpose the conveying device is brought to a standstill in a certain position, the vacuum released at the same time and the slice forcibly released by being pushed down by the release blades. The conveying device 6 does not start again until a new slice is announced by the scanning device 33.

The air-permeable conveying device 6 comprises a number of parallel narrow belts 8. These are guided by guide rollers 7. The guide rollers are preferably toothed and the belts also have teeth. In this way slipping during starting and slowing down of the ocnveying device is avoided, so that the slices can be stopped in a precisely predetermined position above the stack. The release blades 12 have a joint mounting support 13 and are moved so far downwards by a lever 14 when the slice 40 is released that if a slice sticks to the conveying device it cannot be drawn up again by any vacuum remaining in the chamber 10. The narrow belts 8 run on the bottom of the conveying device 6 on bearing rails 15 which at the same time bound the vacuum chamber on the lower side. The distance between two bearing rails 15 or two belts 8 is so great that the release blades 12 can be moved down through it and a current of air through which the slices are held on the conveying device can be produced. The release blades 12 in conjunction with the release of the vacuum in the chamber 9 help to ensure that the conveying device 6 is quickly ready to receive a new slice and that the slices fall down in a horizontal position.

The slices fall on to a stacking surface 16 which is arranged on a lever 17 moved by a crank gear 18 in a gearbox 19. The crank gea is designed in such a way that the stacking surface 16 is first drawn downwards roughly parallel to its initial position and then simultaneously downwards and sideways and held there. The initial movement of the stacking surface 16 is quicker than that of the stack 41. This means that the surface can be removed from underneath the stack without the stack slipping to the side. While the stack 41 is falling on to the moving conveyor belt 20 the stacking surface is returned to its initial position. In order to ensure that the stacking surface 16 does not touch the top slices as they fall, thus risking displacing them, the stacking surface 16 is returned to its initial position along another path. The individual positions of the stacking surface are illustrated as 16a, 16b and 16c in the drawing. By moving the stacking surface 16 a part stack 41 which has collected on the stacking surface 16 can be combined with another part stack sliced on another slicing machine and conveyed on the conveyor belt 20. In this way stacks of different types of food can be formed. Underweight stacks can also be carried on the conveyor 20, and when the weight shortage has been determined by a weighing machine on the belt 20 a further slice to make up the difference can be cut by one of the devices and added to the stack.

In order to form stacks of overlapping slices the stacking surface 16 can be moved sideways by the amount of the overlapping through operation of the device 35. Here the stacking surface 16 remains parallel to its initial position. Should an overlapping stack be formed of various types of cheese it is advantageous to have the slicing machine (not illustrated) displaceable sideways.

For production of stacks of slices emanating from several sources it is desirable to have a number of slicing machines and vacuum conveyors located parallel to one another and each operating in conjunction with the one stacking support 16 and conveyor 20. The same movement of the stacking support 16 which was previously described for use in producing overlapping slices can be used to produce stacks emanating from several sources, by moving the stacking surface 16 under each of the vacuum conveyors in turn. Overlapping can be produced in the same way in addition if desired or by shifting the position of the slicing machines (not shown) which are located before the respective weighing conveyors 2.

The device according to the invention can be provided with a paper feed arrangement. The web 22 of paper is drawn by the take-up rollers 24 from a magazine roll 23 and conveyed to a paper cutter 30 which cuts off the individual sheets. The paper is fed in by feed rollers 25 and 26 at about the time the air-permeable conveying device 6 grips a slice of the right weight. The sheet of paper fed in under the cutter 30 is cut off when the falling slice 40 comes into contact with the paper. In order to ensure that the paper projects roughly horizontally the feed rollers are provided with devices which produce corrugations in the paper. For instance, the feed roller 25 has circular projections and the feed roller 26 has a recess corresponding to the feed roller 25 as a rotating section. Satisfactory cutting of the fed-in sheet of paper is achieved by pressing the front end of the web before the cutting movement of the cutter through a clamp 31 against a counter surface 32. The different speeds of the web 22 of paper in the take-up rollers 24 and the feed rollers 25 and 26 is evened out by a loop 29 in the web 22 of paper. This loop is drawn by vacuum into a shaft 27. The vacuum holds the loop taut without impeding the movement of the web of paper. The shaft 27 is provided with a vacuum connection 28. The size of the loop 29 is controlled by, for instance, two photocells 34. If the loop becomes too large the take-up rollers 24 are stopped. If the loop becomes to small to take-up rollers 24 are speeded up until the loop is sufficiently big again.

By the process according to the invention food slices which are difficult to handle by machine can be formed into stacks of even weight at a high rate of output, it being possible both to produce overlapping and to insert a piece of paper between the individual slices. The apparatus according to the invention can be combined with known high-speed slicing machines and automatic packaging machines. It enables work by hand to be cut out completely during the packaging operation.

What is claimed is:

1. A method of forming stacks of flexible food slices comprising feeding a series of flexible food slices in turn to the underside of a moving air permeable conveyor, attaching each slice in turn to the underside of the conveyor by vacuum, conveying each attached slice to a position over a stacking support, stopping said conveyor with said slice at said position, releasing the vacuum and forcibly releasing said slice to allow it to fall from the conveyor and form a stack on said stacking support, and when the stack contains the desired number of slices the said stacking support then being moved downwardly and outwardly from under the stack to allow said stack to fall on a moving conveyor for conveyance away.

2. A method according to claim 1 in which sheets of paper are interleaved between each of the slices as they fall from the conveyor to form said stack on the stacking support.

3. A method according to claim 1 in which the stacking support is shifted in alternating directions from under said conveyor during formation of the stack so that the stack is formed with a staggered configuration.

4. A method according to claim 1 in which one stacking support is shifted between at least two air permeable conveyors to receive slices at different times from each of the conveyors and form a stack of slices emanating from different sources.

* * * * *